(12) United States Patent
Hirano et al.

(10) Patent No.: US 10,710,482 B2
(45) Date of Patent: Jul. 14, 2020

(54) SEAT FOR VEHICLES

(71) Applicant: TACHI-S CO., LTD., Akishima-shi, Tokyo (JP)

(72) Inventors: Takumi Hirano, Tokyo (JP); Shinichi Mizuno, Tokyo (JP); Tsuyoshi Tabata, Tokyo (JP); Hiromi Yamamoto, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 16/078,102

(22) PCT Filed: Feb. 15, 2017

(86) PCT No.: PCT/JP2017/005553
§ 371 (c)(1),
(2) Date: Aug. 21, 2018

(87) PCT Pub. No.: WO2017/150191
PCT Pub. Date: Sep. 8, 2017

(65) Prior Publication Data
US 2019/0031066 A1      Jan. 31, 2019

(30) Foreign Application Priority Data
Mar. 4, 2016   (JP) ................. 2016-041785

(51) Int. Cl.
*A47C 7/02*      (2006.01)
*B60N 2/70*      (2006.01)
(Continued)

(52) U.S. Cl.
CPC .......... *B60N 2/7017* (2013.01); *B29C 44/129* (2013.01); *B29C 44/14* (2013.01);
(Continued)

(58) Field of Classification Search
CPC ..... B29C 44/129; B29C 44/14; B29C 44/145; B60N 2/58; B60N 2/5875; B60N 2/5866; B60N 2/5816; B29K 2675/00
(Continued)

(56) References Cited

U.S. PATENT DOCUMENTS 4,116,736 A  *  9/1978  Sanson ................. B29C 44/146
                                                              156/245
4,699,427 A  * 10/1987  Kobayashi ......... B29D 99/0092
                                                              297/452.27
(Continued)

FOREIGN PATENT DOCUMENTS

JP    H08-117462 A    5/1996
JP    H10-211839 A    8/1998
(Continued)

OTHER PUBLICATIONS

International Search Report from International Patent Application No. PCT/JP2017/005553, dated Apr. 18, 2017.

*Primary Examiner* — Chi Q Nguyen
(74) *Attorney, Agent, or Firm* — SGPatents PLLC

(57) ABSTRACT

A seat for vehicles including a seat cushion, a seat back, and a head rest has the following arrangement to ensure that a surface member can be relatively easily but positively removed from a urethane pad if a foam molding defect is found in the urethane pad in integral molding of the urethane pad and the surface member. In the seat for vehicles, any one of the seat cushion, seat back, and head rest has a configuration where a surface of the urethane pad is covered with the surface member. The urethane pad and the surface member are partially bonded together by integral molding.

17 Claims, 8 Drawing Sheets

(51) Int. Cl.
  *B29C 44/12* (2006.01)
  *B29C 44/14* (2006.01)
  *B60N 2/58* (2006.01)
  *B29K 623/00* (2006.01)
  *B29K 75/00* (2006.01)
  *B29K 105/04* (2006.01)
  *B29K 105/08* (2006.01)
  *B29K 675/00* (2006.01)
  *B29L 31/30* (2006.01)
  *B29L 31/00* (2006.01)

(52) U.S. Cl.
  CPC ........ *B29C 44/145* (2013.01); *B60N 2/5816* (2013.01); *B60N 2/5891* (2013.01); *B29K 2075/00* (2013.01); *B29K 2105/04* (2013.01); *B29K 2105/0809* (2013.01); *B29K 2623/06* (2013.01); *B29K 2623/12* (2013.01); *B29K 2675/00* (2013.01); *B29L 2031/3023* (2013.01); *B29L 2031/771* (2013.01)

(58) Field of Classification Search
  USPC ................... 297/452.61, DIG. 1, DIG. 2
  See application file for complete search history.

(56) References Cited

U.S. PATENT DOCUMENTS

| | | | | |
|---|---|---|---|---|
| 4,813,738 A * | 3/1989 | Ito | B60N 2/5685 | 219/217 |
| 4,840,430 A * | 6/1989 | Shimada | B29D 99/0092 | 156/212 |
| 4,975,135 A * | 12/1990 | Lowe | B29C 44/569 | 156/155 |
| 5,702,159 A * | 12/1997 | Matsuoka | A47C 7/18 | 297/452.48 |
| 5,817,392 A * | 10/1998 | Havens | B29D 99/0092 | 428/99 |
| 5,850,645 A * | 12/1998 | Ogawa | A47C 7/18 | 5/653 |
| 6,093,351 A * | 7/2000 | Ogawa | B29C 44/025 | 264/46.4 |
| 6,226,819 B1 * | 5/2001 | Ogawa | A47C 7/18 | 5/653 |
| 7,859,423 B2 * | 12/2010 | Yamanaka | B60N 2/5685 | 180/273 |
| 8,162,403 B2 * | 4/2012 | Ito | A47C 27/12 | 297/452.48 |
| 2006/0273650 A1 * | 12/2006 | Embach | A47C 7/18 | 297/452.27 |
| 2011/0018329 A1 * | 1/2011 | Galbreath | B60N 2/012 | 297/452.18 |
| 2011/0221254 A1 * | 9/2011 | Lindsay | B29C 44/0461 | 297/452.18 |
| 2014/0292043 A1 | 10/2014 | Nii et al. | | |
| 2015/0336491 A1 * | 11/2015 | Abe | B60N 2/646 | 297/452.48 |
| 2016/0052435 A1 * | 2/2016 | Nakada | B60N 2/646 | 297/452.48 |
| 2016/0167551 A1 * | 6/2016 | Okamoto | B60N 2/58 | 297/391 |

FOREIGN PATENT DOCUMENTS

| | | |
|---|---|---|
| JP | 2004-136600 A | 5/2004 |
| JP | 2014-193230 A | 10/2014 |

* cited by examiner

SEAT FOR VEHICLES

TECHNICAL FIELD

The present invention relates to a seat for vehicles formed by covering a surface of a foam molded urethane (hereinafter, referred to as "urethane pad") with a surface member (trim cover). Particularly, the present invention relates to a seat for vehicles where the urethane pad and the trim cover are integrally molded.

BACKGROUND ART

The seat for vehicles having a configuration where the surface of a pad (urethane pad) formed of foam molded urethane is covered with the surface member (trim cover) has been commonly used. If the surface member is not fixed to the urethane pad, the surface member is displaced relative to the urethane pad when an occupant seated on the seat for vehicles moves thereon. This may lead to decrease in seating comfort for the seated occupant.

For the purpose of prevention of the displacement, Patent Literature 1 discloses a method of integrally molding the urethane pad and the surface member by forming the surface member substantially in a bag shape, followed by injecting a resin foam raw material in the surface member and foaming the material.

CITATION LIST

Patent Literature

PTL 1: Japanese Patent Application Laid-Open No. Hei 8-117462

SUMMARY OF INVENTION

Technical Problem

In contrast to a case where the urethane pad and the surface member are separately formed and then bonded together, the method of integrally molding the urethane pad and surface member, as disclosed in Patent Literature 1, has a merit that a step of bonding together the urethane pad and surface member is not required and hence, production costs can be reduced.

In a case where a defective product is produced because of molding failure in a foam molding step of urethane pad, the surface member formed of a relatively expensive material may sometimes be removed from the urethane pad as a defective product and reused. Since the surface member is bonded to the urethane pad in a large area, the operation of removing the surface member from the urethane pad not only takes much time and labor but also involves likelihood of producing unrecyclable surface member due to breakage.

Accordingly, it is an object of the present invention to address the above-described problems of the prior art and to provide a seat for vehicles which permits the surface member to be relatively easily but positively removed from the urethane pad in the case where the foam molding failure of the urethane pad occurs during the integral molding of the urethane pad and the surface member.

Solution to Problem

According to an aspect of the present invention for solving the above problems, a seat for vehicles includes a seat cushion, a seat back, and a head rest and has an arrangement wherein any one of the seat cushion, seat back, and head rest has a configuration where a surface of a urethane pad is covered with a surface member; and the urethane pad and the surface member are formed by integral molding while partially bonded together.

According to another aspect of the present invention for solving the above problems, a seat for vehicles includes a seat cushion, a seat back, and a head rest and has an arrangement wherein any one of the seat cushion, seat back, and head rest includes a urethane pad and a surface member of a multi-layered structure for covering a surface of the urethane pad, and the urethane pad and the surface member are formed such that the urethane pad is partially bonded to a urethane-pad side layer of the surface member of the multi-layered structure.

Advantageous Effects of Invention

The invention provides the arrangement where the urethane pad and the surface member are partially bonded together when the urethane pad and the surface member are integrally molded by foam molding of urethane. Hence, if a molding failure of the urethane pad occurs when the urethane pad is foam molded, the surface member can be relatively easily but positively removed from the urethane pad. This provides for the reuse of the surface member made of a relatively expensive material.

DESCRIPTION OF EMBODIMENTS

Figure 1:
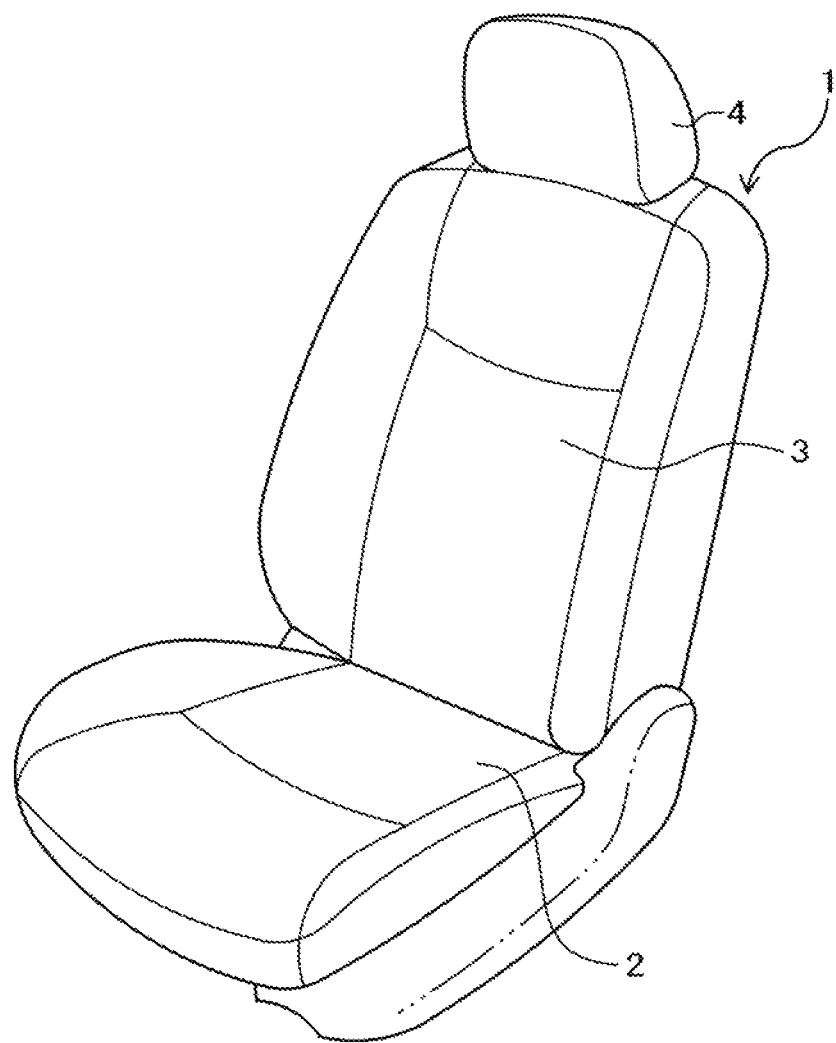
FIG. 1 is a perspective view showing an outer appearance of a seat for vehicles according to Example 1 of the present invention.

The invention pertains to a seat for vehicles which provides for the reuse of a surface member by permitting the surface member to be relatively easily but positively removed from a urethane pad if foam molding failure of the urethane pad occurs during the integral molding of the urethane pad and the surface member.

The embodiments of the present invention will hereinbelow be described with reference to the accompanying drawings. It is noted that the present invention is not limited to the examples described as below but includes a variety of modifications thereof. The following examples are a detailed description for clarity of the present invention but are not necessarily limited to what includes all the described components. Further, some of the components of one example can be replaced with some component of another example. It is also possible to add a component of one example to the structure of another example. A part of the structure of one example can permit the deletion thereof or permit addition of or replacement with some component of another example.

Throughout the Figures equal reference numerals are assigned to the same components, which are explained only once in most cases to avoid repetitions.

Example 1

First, description is made on Example 1 of the present invention which is configured as follows. When a urethane pad and a surface member are integrally molded, a film made of a material non-reactive (non-adherent) to urethane is interposed between the urethane pad and the surface member.

In some cases, a defect is found in the urethane pad after integral molding and hence, the surface member is removed from the urethane pad for recycling purpose. The example provides against such a case as follows. An adhesion area between the urethane pad and the surface member is reduced by interposing the film made of the material non-reactive (non-adherent) to urethane between the urethane pad and the surface member whereby the surface member is made more releasable. This eliminates damage on or breakage of the surface member caused by removing the surface member from the urethane pad. The example ensures that the surface member can be positively recycled.

FIG. 1 shows a basic configuration of a seat for vehicles 1 as a subject matter of the present invention. The seat for vehicles 1 includes: a seat cushion 2 for an occupant to be seated thereon; a seat back 3 which an occupant seated on the seat cushion 2 rests his/her back on; and a head rest 4 supporting a head of the occupant.

Figure 9:
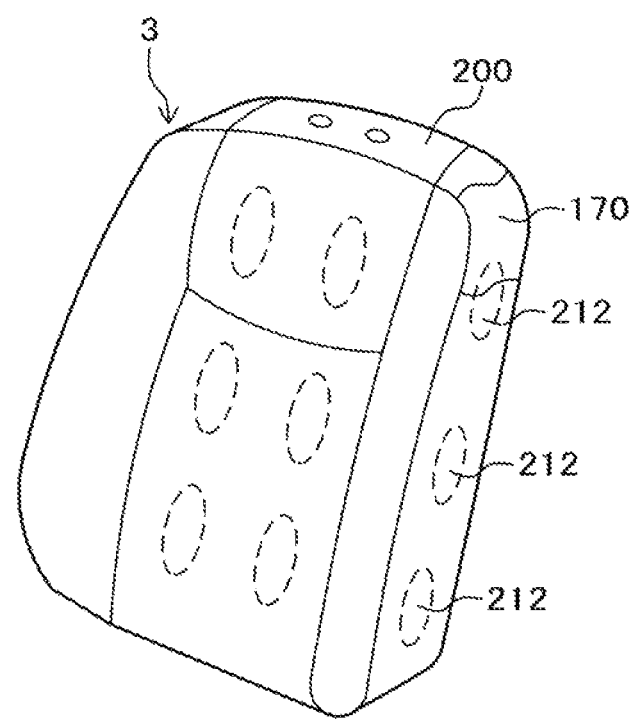
FIG. 9 is a perspective view of a seat back of the seat for vehicles according to Example 1 hereof.

Each of the seat cushion 2, the seat back 3, and the head rest 4 contains therein a foam molded urethane pad, the surface of which is covered with the surface member (see FIG. 9).

Figure 2:
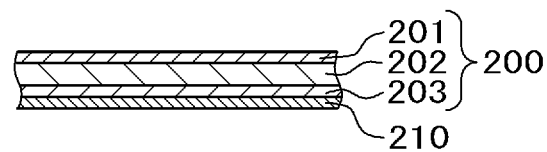
FIG. 2 is a sectional view showing a cross-section of a combined surface member and film of the seat for vehicles according to Example 1 hereof.

A configuration of a surface member 200 covering the surface of the seat cushion 2, seat back 3 and head rest 4 according to the example is shown in FIG. 2. The surface member 200 includes: a surface material 201 on the surface; a cushion material 202 formed of polyurethane under the surface material; and a back cloth 203 covering the back side of the cushion material 202. The surface material 201 and the back cloth 203 are bonded to the cushion material 202 with an adhesive, respectively.

Indicated at 210 is a film which serves as a separator interposed between the urethane pad 170 (see FIG. 9) and the surface member 200. The film 210 is formed of polypropylene or polyethylene, for example, with added fluorine (F) and silicon (Si). The film has a thickness of 0.2 mm or less and is non-reactive to urethane.

In addition to the above, a thin film of polypropylene or polyethylene coated with an inorganic material (e.g., inorganic glass powder), amorphous resin, fluorine, silicon or the like is usable as the film 210.

The film 210 may as well be bonded to the back cloth 201 of the surface member 200.

A procedure of integrally molding the surface member 200 and the urethane pad 170 is described with reference to the accompanying drawings.

Figure 3:
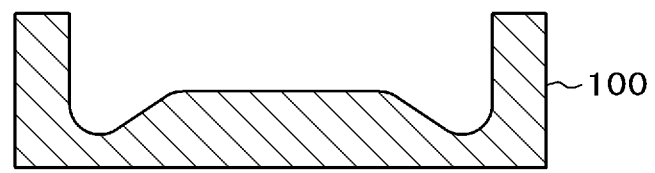
FIG. 3 is a sectional view showing a lower die of molding dies for molding the urethane pad of the seat for vehicles according to Example 1 hereof.

FIG. 3 shows a cross-section of a lower die 100 which is a die for molding the urethane pad 170. The lower die 100 is so formed as to have a cross-sectional shape conforming to the shape of the urethane pad 170.

Figure 4A:
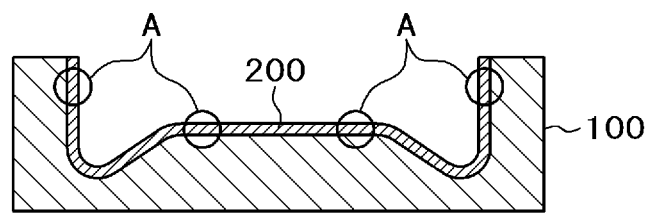
FIG. 4A is a sectional view showing a state where the surface member is placed on the lower die of the molding dies for molding the urethane pad of the seat for vehicles according to Example 1 hereof.

FIG. 4A shows a state where the surface member 200 is placed on the lower die 100. With respect to the lower die 100, the surface member 200 which is upside down comparing a state as shown in FIG. 2 is placed on the lower die 100. Namely, the surface member 200 is placed on the lower die 100 as allowing the surface material 201 thereof in contact with the lower die 100. In this state, the film 210 is on the uppermost side.

Figure 4B:
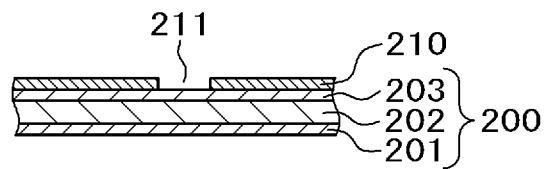
FIG. 4B is a sectional view showing in enlarged dimension the A region of the cross-section of FIG. 4A illustrating the surface member placed on the lower die of the molding dies for molding the urethane pad of the seat for vehicles according to Example 1 hereof.

As shown in an enlarged view of FIG. 4B, the film 210 is formed with a notch 211 at A location as encircled in FIG. 4A. The back cloth 203 on the uppermost side of the surface member 200 is exposed at the notch 211. The notch 211 is formed at four places as shown in the sectional view of FIG.

4A. The plural notches having a predetermined length in direction perpendicular to the drawing surface are discretely formed.

Figure 5:
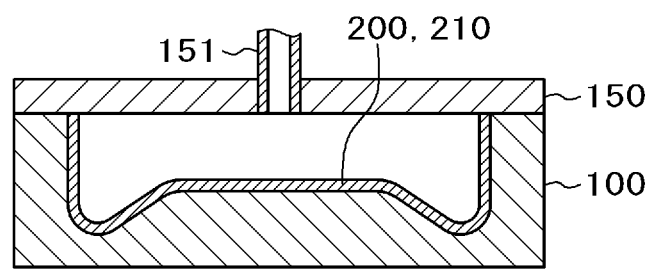
FIG. 5 is a sectional view of an upper die and the lower die of the molding dies for molding the urethane pad of the seat for vehicles according to Example 1 hereof, showing a state where the upper die is mounted on the lower die with the surface member placed thereon.

FIG. 5 shows a state where after placing the surface member 200 on the lower die 100, an upper die 150 is mounted on the lower die 100. The upper die 150 is formed with an inlet port 151 for injecting a urethane foam material in the space between the upper die and the lower die 100.

Figure 6:
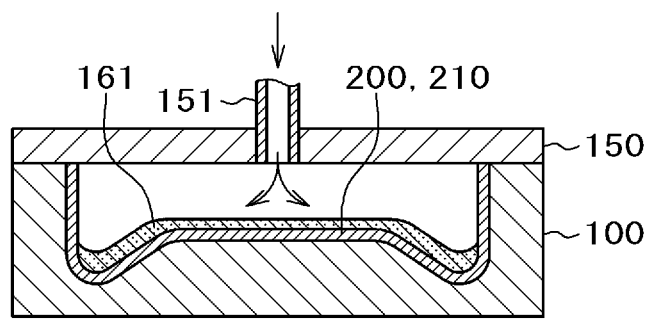
FIG. 6 is a sectional view of the upper die and the lower die showing a state where the upper die is mounted on the lower die with the surface member placed thereon and a foaming agent is injected in the molding dies for molding the urethane pad of the seat for vehicles according to Example 1 hereof.

FIG. 6 shows a state where an unillustrated means is injecting a urethane foam material 161 through the inlet port 151 of the upper die 150 into the space defined by the upper die 150 and the lower die 100. The injected urethane foam material 161 foams in the space defined by the upper die 150 and the lower die 100.

Figure 7:
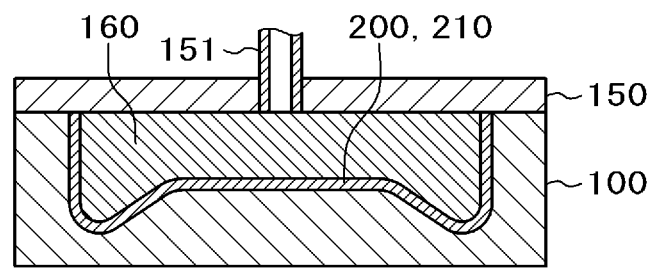
FIG. 7 is a sectional view of the upper die and the lower die, showing a state where the upper die is mounted on the lower die with the surface member placed thereon and the foaming agent is fully injected in the molding dies for molding the urethane pad of the seat for vehicles according to Example 1 hereof.

FIG. 7 shows a state where a foamed urethane fills the space defined by the upper die 150 and the lower die 100. When allowed to stand for a predetermined length of time, the foamed urethane 160 solidifies. In this state, the surface member 200 placed on the lower die 100 does not adhere to the foamed urethane 160 because the surface member is covered with the film 210 formed of the material non-reactive (non-adherent) to urethane.

At the notch 211 formed in the film 210, on the other hand, the foamed urethane 160 is in contact with the back cloth 203 on the uppermost side of the surface member 200 so that the foamed urethane 160 adheres to the back cloth 203. As a result, the foamed urethane 160 and the surface member 200 are partially bonded together at plural places.

Figure 8:
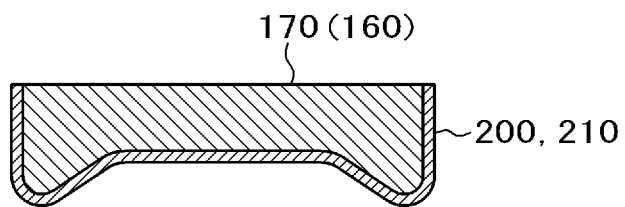
FIG. 8 is a sectional view of the urethane pad of the seat for vehicles according to Example 1 hereof.

FIG. 8 shows a state where the urethane pad 170 made of the solidified urethane foam 160 and the surface member 200 partially bonded to this urethane pad 170 are demolded from the lower die 100.

FIG. 9 shows an example of the seat back 3 thus fabricated. The surface member 200 covering the surface is bonded to the underlying urethane pad 170 at regions 212. That is, the urethane pad 170 and the surface member 200 are not bonded together at areas where the film 210 is interposed between the urethane pad 170 and the surface member 200. On the other hand, the urethane pad 170 and the surface member 200 are bonded together at the regions 212 corresponding to the notches 211 in the film 210.

In a case where deficiency of foaming amount or defective formation is found in the urethane pad 170 formed by molding the foamed urethane the surface of which is covered by the surface member 200, as shown in FIG. 9, the surface member 200 may be sometimes recycled by peeling off the covering surface member 200 from the urethane pad 170 and discarding the urethane pad 170.

In such situation, since the present example is configured, in comparison to the case where the urethane pad 170 is adhered to the surface member 200 on the overall area, such that the urethane pad 170 and the surface member 200 are bonded together only at the regions 212 corresponding to the notches 211 in the film 210, it can achieve a notable reduction of the bonded area.

As a result, it takes a shorter time to peel off the surface member 200 from the urethane pad 170. Further, the area at which the surface member is peeled off from the urethane pad is much smaller than that of the prior art where the urethane pad and the surface member are bonded together on the overall area. Hence, the probability of breakage of the surface member 200 caused by peeling off the surface member is notably reduced.

While the foregoing example has been described by way of the configuration where the film 210 made of the material non-reactive (non-adherent) to urethane is interposed between the urethane pad 170 and the surface member 200. Instead of using the film 210, however, a material non-reactive to urethane, such as fluorine, silicon, inorganic material (e.g., inorganic glass powder) or amorphous resin, may be coated on the side of the back cloth 203 of the surface member 200 which is in contact with the urethane pad 170. In such a case, as well, the back cloth 203 may be provided with regions in correspondence to the notches 211 in the film 210, the regions free from the coating of the material non-reactive to urethane.

Example 2

While Example 1 illustrates the configuration where the film 210 is interposed between the urethane pad 170 and the surface member 200, this example illustrates an example where the seat cushion 2, the seat back 3, and the head rest 4 are formed by forming the urethane pad, followed by removing the film.

Figure 10:
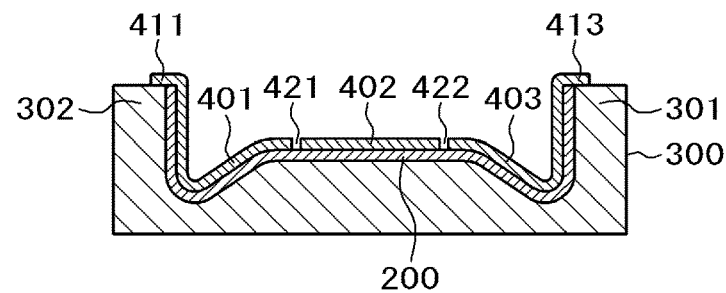
FIG. 10 is a sectional view showing a state where the surface member is placed on a lower die of molding dies for forming a urethane pad of a seat for vehicles according to Example 2 hereof.

FIG. 10 shows a state where the surface member 200 is placed on a lower die 300 and split films (separators) 401, 402, 403 are placed thereon with gaps 421, 422 defined therebetween. The gaps 421, 422 are for exposure of parts of the surface member 200 such as to allow the foamed urethane to adhere to the corresponding parts of the surface member. Each of the gaps has a width of 1 to 2 cm.

The surface member 200 has the same configuration as that of Example 1. The film (separator) 401, 402, 403 is formed of polypropylene or polyethylene with added fluorine (F) or silicon (Si). The film (separator) has a thickness of 2 to 3 mm which is greater than the thickness of the separator (film 210) in Example 1. The film is non-reactive to urethane.

In addition to the above, a film of polypropylene or polyethylene coated with an inorganic material (e.g., inorganic glass powder), amorphous resin, fluorine, silicone or the like is usable as the film 401, 402, 403.

The films 401 and 403 extend longer than the surface member 200, each including a protruded portion (end) 411, 413 which protrudes outward beyond the surface member 200 to extend partially on a top surface of a wall 301, 302 of the lower die 300.

Figure 11:
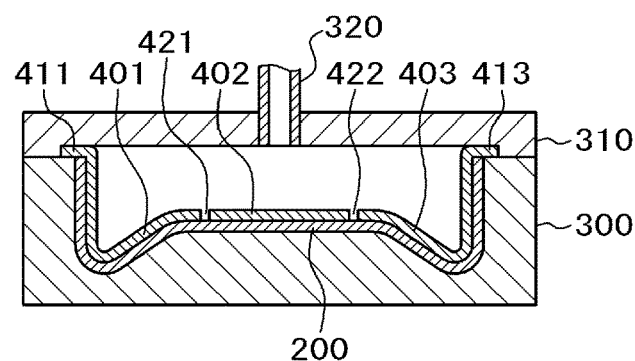
FIG. 11 is a sectional view of an upper die and the lower die of the molding dies for molding the seat for vehicles according to Example 2 hereof, showing a state where the upper die is mounted on the lower die with the surface member placed thereon.

FIG. 11 shows a state where after placing the surface member 200 and the films (separators) 401, 402, 403 on the lower die 300, an upper die 310 is mounted on the lower die 300. The upper die 310 is formed with an inlet port 320 for injecting the urethane foam material in the space between the upper die and the lower die 300. In this state, the portions (ends) 411, 413 on the top surfaces of the walls 301, 302 of the lower die 300 are pressed by the upper die 310.

Figure 12:
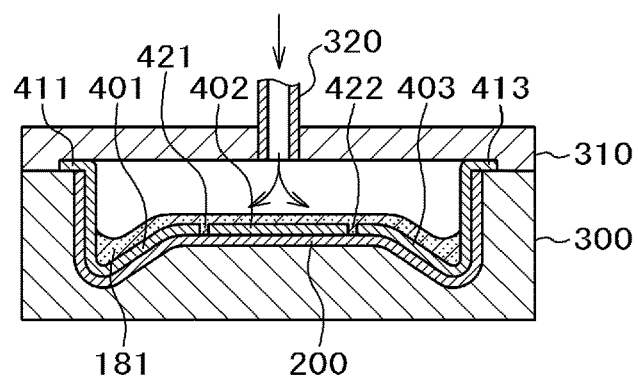
FIG. 12 is a sectional view of the upper die and the lower die showing a state where the upper die is mounted on the lower die with the surface member placed thereon and the foaming agent is injected in the molding dies for molding the urethane pad of the seat for vehicles according to Example 2 hereof.

FIG. 12 shows a state where an unillustrated means injects a urethane foam material 181 through the inlet port 320 of the upper die 310 into the space defined by the upper die 310 and the lower die 300. The injected urethane foam material 181 foams in the space defined by the upper die 310 and the lower die 300.

Figure 13:
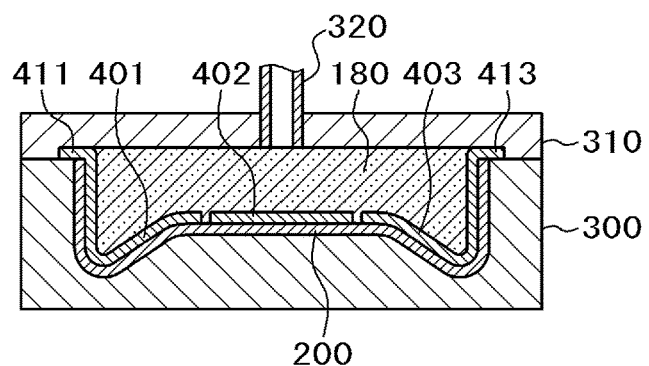
FIG. 13 is a sectional view of the upper die and the lower die showing a state where the upper die is mounted on the lower die with the surface member placed thereon and the foaming agent is fully injected in the molding dies for molding the urethane pad of the seat for vehicles according to Example 2 hereof.

FIG. 13 shows a state where the foamed urethane fills the space defined by the upper die 310 and the lower die 300. When allowed to stand for a predetermined length of time, a foamed urethane 180 solidifies. At this time, the surface member 200 placed on the lower die 100 does not adhere to the foamed urethane 180 at portions which are covered by the films 401, 402, 403 formed of the material non-reactive (non-adherent) to urethane.

At the gaps 421, 422 between the films 401, 402, 403, on the other hand, the foamed urethane 180 is in contact with the back cloth 203 on the uppermost side of the surface member 200 so that the foamed urethane 180 adheres to the back cloth 203. As a result, the foamed urethane 180 and the surface member 200 are partially bonded together at places corresponding to the gaps 421, 422.

Figure 14:
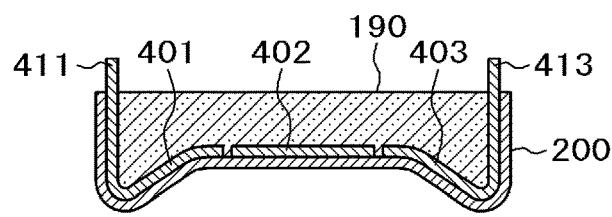
FIG. 14 is a sectional view of the urethane pad showing a state where the urethane pad of the seat for vehicles according to Example 2 hereof is demolded from the lower die of the molding dies.

FIG. 14 shows a state where a urethane pad 190 made of the solidified urethane foam 180 and the surface member 200 partially adhered to this urethane pad 190 are demolded from the lower die 300.

Figure 15:
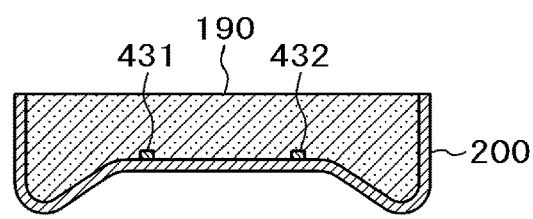
FIG. 15 is a sectional view of the urethane pad showing a state where the urethane pad of the seat for vehicles according to Example 2 hereof is demolded from the lower die of the molding dies and a separator film is extracted from between the urethane pad and the surface member.

The films 401, 402, 403 sandwiched between the urethane pad 190 and the surface member 200 are in a state where the ends 411 and 413 are protruded from between the urethane pad 190 and the surface member 200. In this state, the urethane pad 190 and the surface member 200 are not bonded together at portions sandwiching the films 401, 402, 403 therebetween. By pulling the ends 411 and 413 to extract the films 401, 402, 403 from between the urethane pad 190 and the surface member 200, the surface of the urethane pad 190 is covered by the surface member 200, as shown in FIG. 15.

Figure 16:
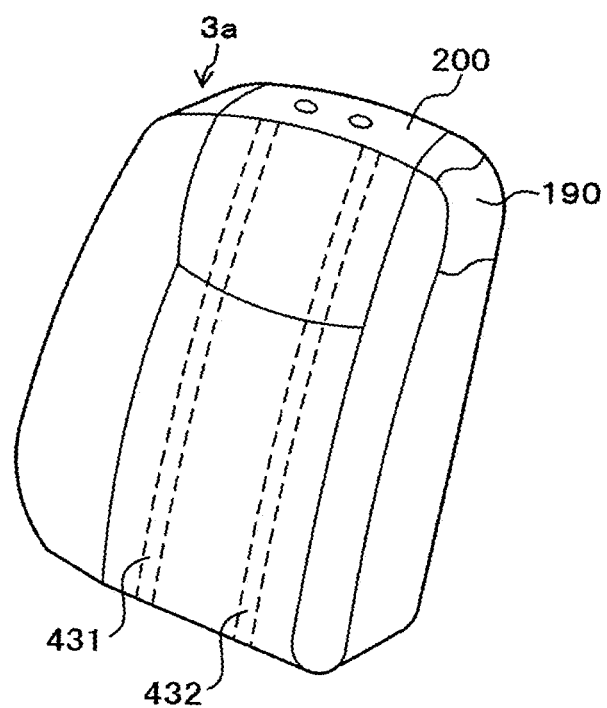
FIG. 16 is a perspective view of a seat back of the seat for vehicles according to Example 2 hereof.

An example of the seat back 3a fabricated in this manner is shown in FIG. 16. The surface member 200 covering the surface of the seat back adheres to the underlying urethane pad 190 via regions 431, 432 indicated by the dotted lines. This prevents significant displacement of the surface member 200 from the urethane pad 190 during the use of the seat back 3a and hence, ensures seating comfort.

On the other hand, in the case of deficiency of foaming amount or defective formation found in the urethane pad 190 formed by molding the foamed urethane the surface of which is covered by the surface member 200, as shown in FIG. 16, the surface member 200 may sometimes be recycled by peeling off the covering surface member 200 from the urethane pad 190 and discarding the urethane pad 190.

In such case, since this example is configured such that the urethane pad 190 and the surface member 200 are bonded together only at the regions 431 and 432, it can achieve a notable reduction of the bonded area in comparison to the prior art where the urethane pad 190 and the surface member 200 are bonded together on the overall area.

Accordingly, it takes a shorter time to peel off the surface member 200 from the urethane pad 190. Further, the area at which the surface member is peeled off is much smaller than that of the prior art where the urethane pad and the surface member are bonded together on the overall area. Hence, the probability of breakage of the surface member 200 caused by peeling off the surface member is notably reduced.

While the above-described example illustrates the configuration where the films 401, 402, 403 formed of the material non-reactive (non-adherent) to urethane is sandwiched between the urethane pad 190 and the surface member 200, the number of the films 401, 402, 403 is not limited to this. The films can be increased or decreased according to the positions at which the surface member 200 and the urethane pad 190 are bonded together.

REFERENCE SIGNS LIST

1 . . . seat for vehicles,
2 . . . seat cushion,
3 . . . seat back,
4 . . . head rest
100, 300 . . . lower die
150, 310 . . . upper die
160, 180 . . . foamed urethane
170, 190 . . . urethane pad
200 . . . surface member
210 . . . film
212 . . . region
401, 402, 403 . . . film
431, 432 . . . region

The invention claimed is:

1. A seat for vehicles comprising a seat cushion, a seat back, and a head rest, wherein one or more of the seat cushion, seat back, and head rest has a configuration comprising an integral molding that includes a urethane pad and a surface member covering a surface of the urethane pad, with the surface member being partially bonded to the urethane pad, and
wherein a film is inserted between the urethane pad and the surface member at a portion where the urethane pad and the surface member are not bonded together.

2. The seat for vehicles according to claim 1, the film is a film having non-reactivity to urethane which forms the urethane pad.

3. The seat for vehicles according to claim 1, wherein the surface member is bonded to the urethane pad at a plurality of bonded regions having portions separated by intervening non-bonded regions.

4. The seat for vehicles according to claim 1, wherein the surface member is bonded to the urethane pad at a plurality of discrete bonded regions.

5. The seat for vehicles according to claim 1, wherein a total area of a urethane-pad-side surface of the surface member bonded to the urethane pad is less than a total area of the urethane-pad-side surface not bonded to the urethane pad.

6. A seat for vehicles comprising a seat cushion, a seat back, and a head rest, wherein one or more of the seat cushion, seat back, and head rest has a configuration comprising an integral molding that includes a urethane pad and a surface member covering a surface of the urethane pad, with the surface member being partially bonded to the urethane pad, and
wherein at a portion where the urethane pad and the surface member are not bonded together, a material having non-reactivity to urethane which forms the urethane pad is coated on a surface of the surface member which is in contact with the urethane pad.

7. The seat for vehicles according to claim 6, wherein the surface member is bonded to the urethane pad at a plurality of bonded regions having portions separated by intervening non-bonded regions.

8. A seat for vehicles comprising a seat cushion, a seat back, and a head rest, wherein one or more of the seat cushion, seat back, and head rest has a configuration comprising an integral molding that includes a urethane pad and a surface member covering a surface of the urethane pad, with the surface member being partially bonded to the urethane pad, and
wherein the surface member comprises: a surface material; a cushion material formed of polyurethane under the surface material and having a front side covered by the surface material; and a back cloth covering a back side of the cushion material, the back cloth being in contact with the urethane pad and partially bonded to the urethane pad.

9. The seat for vehicles according to claim 8, wherein the surface member is bonded to the urethane pad at a plurality of bonded regions having portions separated by intervening non-bonded regions.

10. A seat for vehicles comprising a seat cushion, a seat back, and a head rest, wherein one or more of the seat cushion, seat back, and head rest includes a urethane pad and a surface member having a multi-layered structure and covering a surface of the urethane pad, with a urethane-pad-side layer of the surface member be ing partially bonded to the urethane pad, and wherein at a portion where the urethane pad and the urethane-pad-side layer of the surface member are not bonded together, a film is inserted between the urethane pad and the urethane-pad-side layer of the surface member.

11. The seat for vehicles according to claim 10, wherein the urethane-pad-side layer of the surface member is bonded to the urethane pad at a plurality of bonded regions having portions separated by intervening non-bonded regions.

12. The seat for vehicles according to claim 10, wherein the urethane-pad-side layer of the surface member is bonded to the urethane pad at a plurality of discrete bonded regions.

13. The seat for vehicles according to claim 10, wherein a total area of the urethane-pad-side layer of the surface member bonded to the urethane pad is less than a total area of the urethane-pad-side layer not bonded to the urethane pad.

14. A seat for vehicles comprising a seat cushion, a seat back, and a head rest, wherein one or more of the seat cushion, seat back, and head rest includes a urethane pad and a surface member having a multi-layered structure and covering a surface of the urethane pad, with a urethane-pad-side layer of the surface member being partially bonded to the urethane pad, wherein the urethane pad and the surface member constitute parts if an integral molding having the urethane-pad-side layer of the surface member partially bonded to the urethane pad, and wherein at a portion where the urethane pad and the urethane-pad-side layer of the surface member are not bonded together, a film having non-reactivity to urethane which forms the urethane pad is inserted between the urethane pad and the urethane-pad-side layer of the surface member.

15. A seat for vehicles comprising a seat cushion, a seat back, and a head rest, wherein one or more of the seat cushion, seat back, and head rest includes a urethane pad and a surface member having a multi-layered structure and covering a surface of the urethane pad, with a urethane-pad-side layer of the surface member being partially bonded to the urethane pad, wherein the urethan pad and the surface member constitute parts of an integral molding having the urethane-pad-side layer of the surface member partially bonded to the urethane pad, and a material having non-reactivity to urethane which forms the urethane pad is coated on a surface of a urethane-pad-side layer of the surface member at a portion where the urethane pad and the urethane-pad-side layer of the surface member are not bonded together.

16. A seat for vehicles comprising a seat cushion, a seat back, and a head rest, wherein one or more of the seat cushion, seat back, and head rest includes a urethane pad and a surface member having a multi-layered structure and covering a surface of the urethane pad, with a urethane-pad-side layer of the surface member being partially bonded to the urethane pad, and wherein the surface member of the multi-layered structure comprises: a surface material; a cushion material formed of polyurethane under the surface material and having a front side covered by the surface material; and a back cloth covering a back side of the cushion material, the back cloth being in contact with the urethane pad and partially bonded to the urethane pad.

17. The seat for vehicles according to claim 16, wherein the urethane-pad-side layer of the surface member is bonded to the urethane pad at a plurality of bonded regions having portions separated by intervening non-bonded regions.

\* \* \* \* \*